July 26, 1955  H. M. SCHUBERT  2,713,944
COMBINATION CHERRY STEMMER AND SORTER
Filed Sept. 24, 1952  3 Sheets-Sheet 2
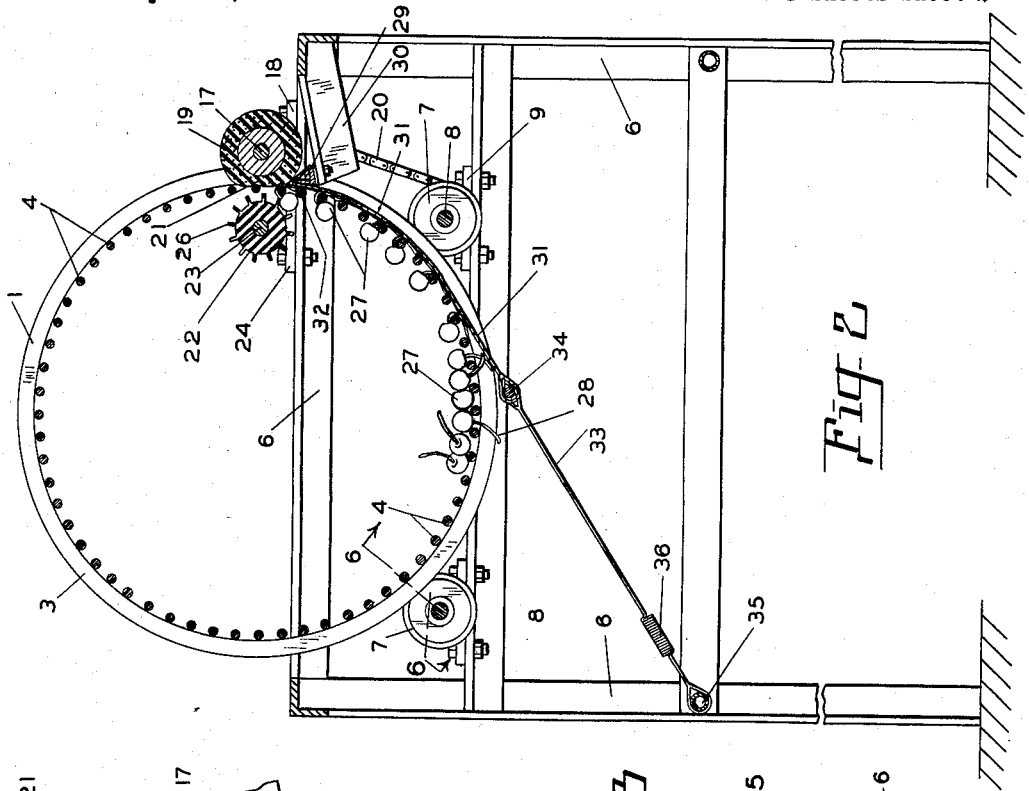
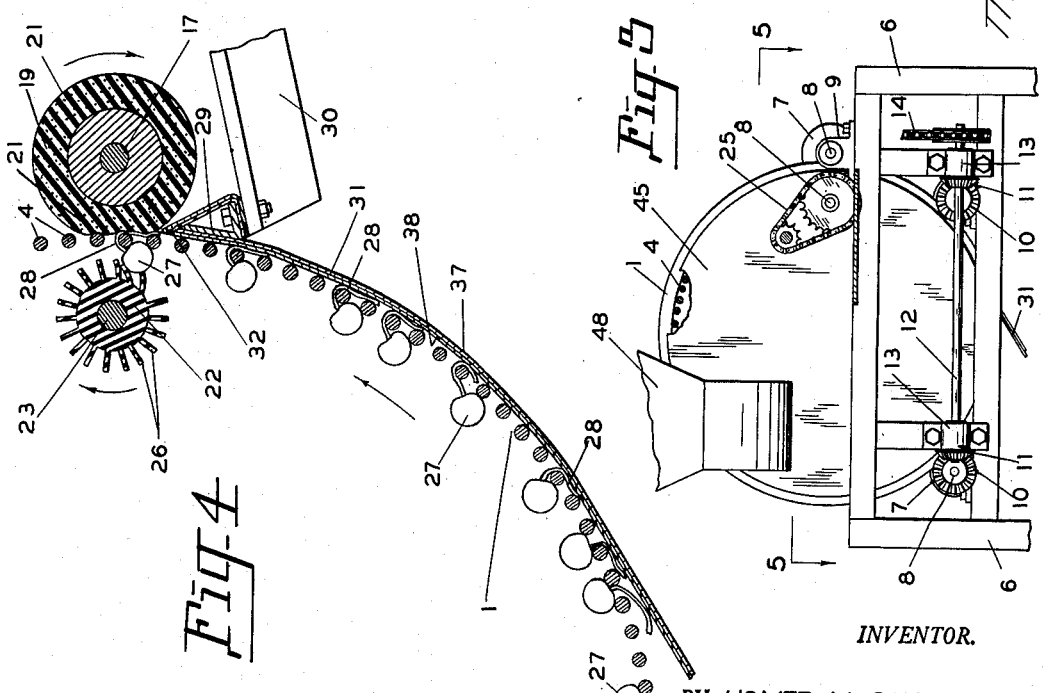
INVENTOR.
BY HOMER M. SCHUBERT
ATTORNEY

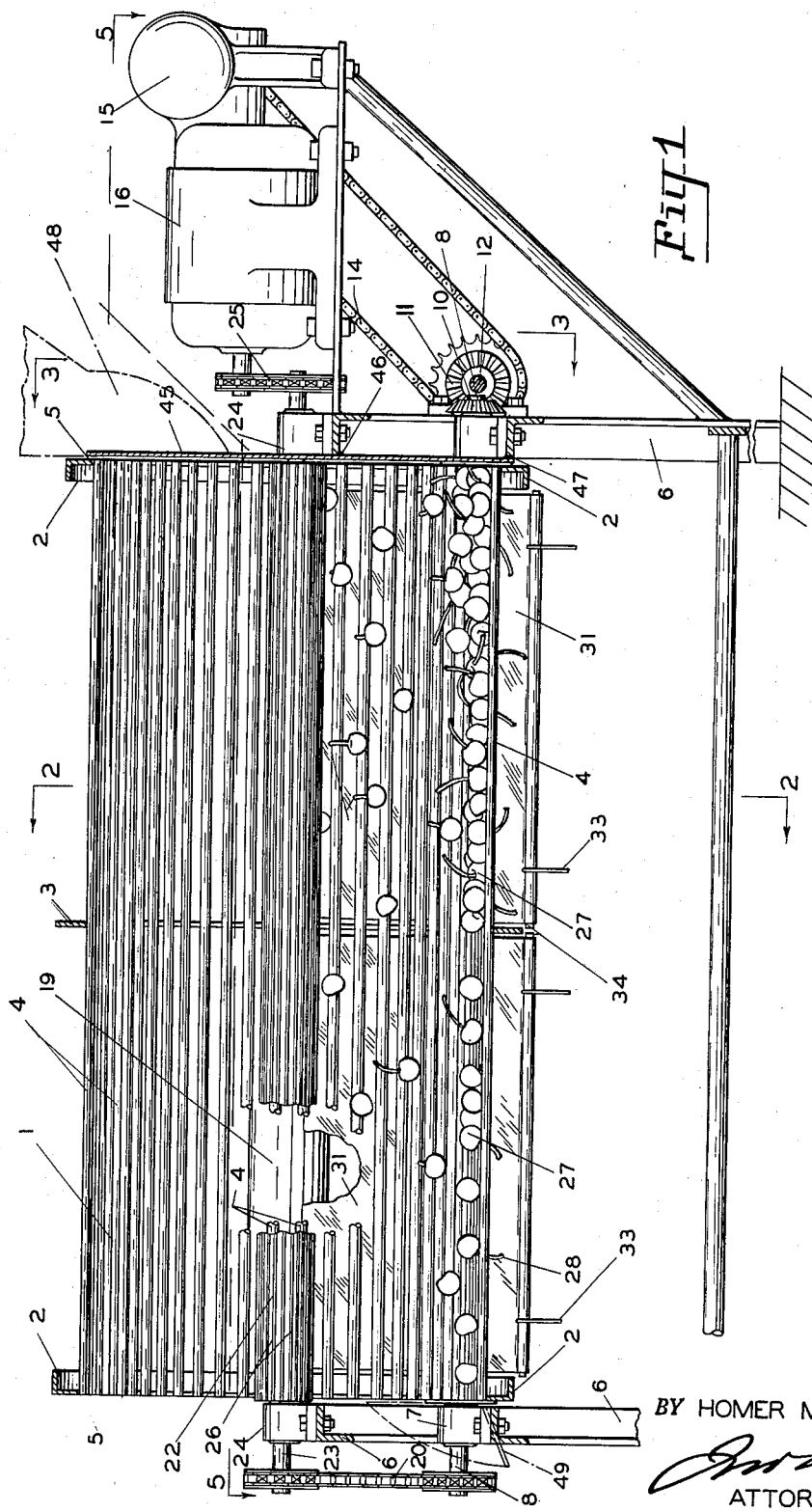

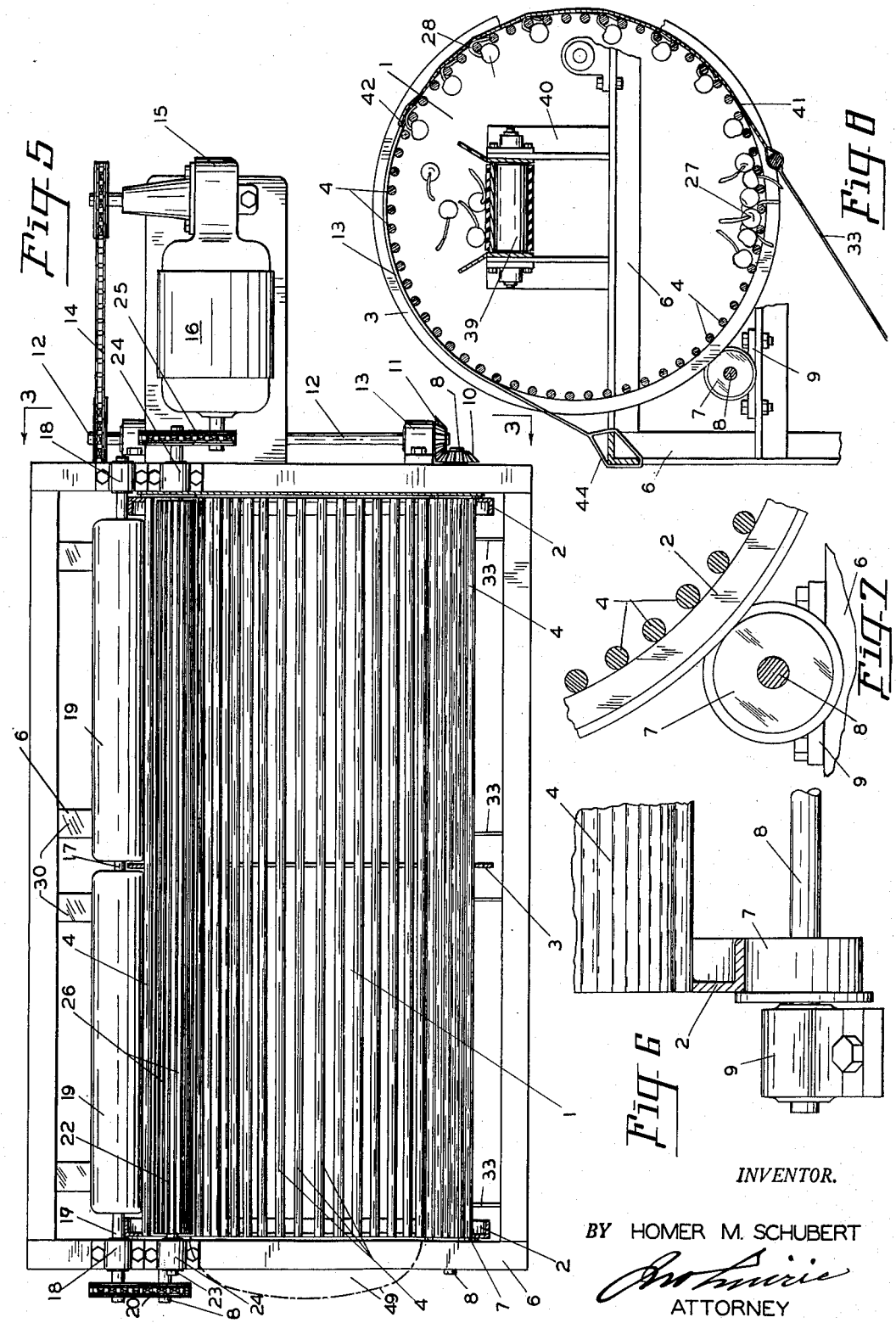

2,713,944

COMBINATION CHERRY STEMMER AND SORTER

Homer M. Schubert, Salem, Oreg.

Application September 24, 1952, Serial No. 311,279

2 Claims. (Cl. 209—108)

This invention relates to a cherry stemmer and sorter, and is particularly adapted for removing the stems from cherries and for separating the cherries having stems thereon and those not having stems.

The primary object of the invention is to remove the stems from cherries by passing the cherries through a squirrel cage cylinder in a continuous flow.

In the carrying out of this object, the cherries flow through a squarrel cage cylinder consisting of parallelly spaced rods, the stems of the cherries project through the rods and are held against the rods by an apron until they reach a point where the stems are gripped by a resilient roller, at the same time the cherries are brushed away from the stems being held by the rods by a rotating brush.

A further object of the invention is to separate the cherries whose stems have already been removed from the cherries from those whose stems are still attached.

This object is also carried out by the cherries passing through a squirrel cage cylinder comprised of spaced rods into which the stems enter and are held to the rods by an apron pressing the said stems thereagainst in the rotation of the drum until the cherries reach a certain point, at which time the apron ends its contact with the rod, releasing the stems and cherries into a conveyor which separates them from the cherries passing through the cylinder without stems.

These and other incidental objects will be apparent in the drawings, specification and claims.

Referring to the drawings:

Figure 1 is a side sectional elevation of my new and improved cherry stemmer and sorter.

Figure 2 is an end sectional view, taken on line 2—2 of Figure 1.

Figure 3 is an end sectional view, taken on line 3—3 of Figure 1, illustrating the driving mechanism for the revolving cylinder.

Figure 4 is an enlarged fragmentary section view, illustrating the principle of removing the stems from the cherries.

Figure 5 is a sectional plan view, taken on line 5—5 of Figure 1.

Figure 6 is a fragmentary enlarged detail sectional view, taken on line 6—6 of Figure 2, illustrating the supporting trunnions for the revolving cylinder.

Figure 7 is an end view of Figure 6.

Figure 8 is an end sectional view, the same as shown in Figure 2, except that the machine has been converted into a sorter for sorting the cherries having stems from those not having stems.

Referring more specifically to the drawings:

My new and improved cherry stemmer and sorter is comprised of a squirrel cage cylinder 1. The cylinder consists of rings 2 and 3 having rods 4 secured thereto at 5, preferably by welding. These rods are spaced from one another to allow the stems of the cherries to pass therebetween, but preventing the cherries from passing through.

The squirrel cage cylinder is mounted to a framework 6 by way of trunnion wheels 7, which are keyed to the shafts 8, the said shafts in turn being journalled to the framework 6 by the bearings 9. This structure is best shown in Figures 6 and 7. The shafts 8 are rotated by the bevel gears 10, which are keyed to the said shafts and are revolved by the bevel gears 11, which are keyed to the cross shaft 12 journalled within the bearings 13, which are mounted to the framework 6 of the machine.

The shaft 12 is rotated by the chain 14, which in turn is driven by the reduction gear 15 forming part of the motor 16, revolving the cylinder in the direction indicated by the arrows.

When the machine is used as a stemmer, the shaft 17 is mounted within the bearings 18. This shaft has soft rubber rollers 19 mounted thereon, as best illustrated in Figures 2, 4 and 5. The shaft is driven in the direction indicated by the arrows from one of the shafts 8 by way of the chain 20, referring to Figures 2 and 5.

The surface 21 of the rollers 19 press against the rods 4, as indicated in Figure 4. Running longitudinally of the cylinder is a brush type roller 22. This roller is mounted to a shaft 23, which is journalled within the bearings 24 and is rotated directly from the motor 16 by way of the chain drive 25, referring to Figures 3 and 5 particularly.

The roller 22 may be of the structure indicated, consisting of a rubber roll having flexible fins 26 running longitudinally thereof. Flexible nobs or fingers may be substituted for these fins, or the roller might be of a soft flexible rubber of a relatively smooth surface. The object of the said roller is to pull the cherries 27 away from the stems 28, which are being held by the roller 19, as indicated in Figures 2 and 4.

Running longitudinally of the cylinder is a bar 29, which is secured to the frame members 30, which in turn form part of the main frame 6. Secured to the bar, as best illustrated in Figure 4, is an apron 31. The apron 31 extends under the roller 19 at 32, bearing against the rods 4. The lower end of the apron is stretched by the tie rods 33, which are secured at their upper ends to the apron by way of the cross rods 34 and to the cross bar 35 of the framework 6 at their lower ends through the springs 36, the spring 36 holding the apron against the rods 4 of the cylinder 1 throughout a considerable portion of the circumference of the said cylinder.

This apron may consist of two pieces of material, the main material 37 forming the body of the apron while a second piece of material 38 may contact the rods and stems of the cherries directly, being of a nature to best perform the work of holding the stems against the rods.

The entrance end of the cylinder is closed by an end plate 45. This end plate may be welded or otherwise secured to the frame 6 at 47 and 46. The cherries enter the cylinder by way of the hopper 48, which is secured to the end plate 45 by any suitable means, as best illustrated in Figure 3. The cherries are delivered out of the cylinder by way of the chute 49, which is indicated by broken lines in Figures 1 and 5.

When the machine is used as a sorter, the rollers 19 and the roller 22 are removed from the machine and a conveyor 39 is mounted throughout the length of the cylinder. This conveyor is mounted to the framework 6 of the machine by any suitable support as indicated at 40. The apron 31 is removed from the machine and an apron 41 is next placed thereon, extending to the point 42 on the circumference of the cylinder.

Flexible tie rods 43 connect to the apron at 42 and are dead-ended to the frame 6 at 44. The tie rods 33 are connected to the framework the same as that illustrated in Figure 2, the said tie rods holding the apron tightly against the rods 4, referring to Figure 8.

I will now describe the operation of my new and improved combined cherry stemmer and sorter. When the machine is used as a stemmer, the stems 28 of the cherries 27 drop down between the rods 6, illustrated in Figure 4. As the cylinder is revolved in the direction of the arrow the stems not held between the rods and apron 31 lift the cherries as indicated. When they reach the top position the surface 21 of the roller 19 engages the stem pressing it tightly against the rods 4.

As the roller 22 revolves at a relative high rate of speed the fins or fingers 26 strike the cherry pulling the same away from the stem, which is being held by the roller 19 against the rods 4, the cherry then drops back into the squirrel cage cylinder where it is delivered out the end of the cylinder by way of a delivery chute 49, which is indicated by the broken lines. The cherries not having stems will naturally not be raised by the rods 4 of the drum, but will flow directly through the same.

When may machine is used as a sorter, the rollers 19 and the roller 26 will be removed from the machine and the conveyor 39 mounted longitudinally of the drum and driven by suitable driving means not here shown. The stems of the cherries will enter between the rods 4 and the apron 41 at the lower part of the apron and the bottom part of the cylinder. This will carry the cherries up and around as illustrated in Figure 8 to the end 42 of the apron where they will be released, dropping into the conveyor 39.

The cherries not having stems will pass on through the drum and be discharged out the chute 49. The cherries having the stems on and being delivered out the discharge end of the drum will be separated from those being delivered by the drum where they are carried to their final destination.

What is claimed is:

1. Cherry handling apparatus comprising a support, a squirrel-cage cylinder comprising axially extending rods spaced less than the diameter of a cherry, means for rotating said cylinder, means at one end of said cylinder for feeding cherries into said cylinder, means at the other end of said cylinder for discharging cherries therefrom, an apron mounted on said support and trained partially around said cylinder to trap the stems of the cherries around the cylinder rods, one end of said apron being disposed adjacent the upper periphery of said cylinder, and a conveyor disposed longitudinally within said cylinder and beneath said apron end to receive the cherries as their stems are released by said apron.

2. An apparatus as defined in claim 1 wherein one end of said apron is fixed on the support and one end is connected to the support by springs.

References Cited in the file of this patent

UNITED STATES PATENTS

| | | |
|---|---|---|
| 155,874 | Lee | Oct. 13, 1874 |
| 1,409,803 | Urschel | Mar. 14, 1922 |
| 1,743,240 | Ryder | Jan. 14, 1930 |
| 2,194,058 | Urschel | Mar. 19, 1940 |
| 2,462,682 | Schubert | Feb. 22, 1949 |
| 2,668,619 | Wormser et al. | Feb. 9, 1954 |
| 2,693,834 | Frova | Nov. 9, 1954 |